United States Patent [19]

Baudouin

[11] 4,002,484
[45] Jan. 11, 1977

[54] PROCESS FOR THE MANUFACTURE OF A FINE WHITE FILLER FOR INDUSTRIAL PURPOSES

[75] Inventor: Jacques Baudouin, Montelimar, France

[73] Assignee: Ciments Lafarge, France

[22] Filed: Nov. 9, 1973

[21] Appl. No.: 414,449

[30] Foreign Application Priority Data

Nov. 13, 1972 France .............. 72.40247

[52] U.S. Cl. .............................. 106/306; 106/100
[51] Int. Cl.² .......................................... C09C 1/02
[58] Field of Search ............. 106/306, 89, 97, 100; 423/518, 555

[56] References Cited

UNITED STATES PATENTS

| | | | |
|---|---|---|---|
| 2,248,032 | 7/1941 | Dunn et al. | 106/97 |
| 3,391,995 | 7/1968 | Roserstock et al. | 106/306 |
| 3,565,648 | 2/1971 | Fora Mori et al. | 106/89 |

FOREIGN PATENTS OR APPLICATIONS 1,115,482  5/1968  United Kingdom .............. 106/306

Primary Examiner—Winston A. Douglas
Assistant Examiner—J. V. Howard
Attorney, Agent, or Firm—Berman, Aisenberg & Platt

[57] ABSTRACT

A substantially stoichiometric mixture of calcic aluminate and calcium sulphate, as white as possible, formed at a temperature in the range of about 20° C to 90° C, is hydrated simultaneously; water is added at least in stoichiometric proportions for the reaction and at a maximum in an amount such that after the reaction a product is obtained containing 5% (dry) ettringite and 95% (by weight) water, stoichiometry being defined, for example by the reaction

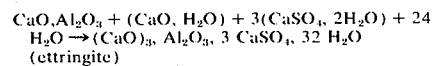

It is thus possible to obtain in an economical and very flexible manner, ettringite, or suspensions containing same, for all industrial uses, notably for paper-making.

23 Claims, No Drawings

PROCESS FOR THE MANUFACTURE OF A FINE WHITE FILLER FOR INDUSTRIAL PURPOSES

The object of the present invention is a process for the manufacture of a fine white filler for use in various industries, such as the paper-making, paint and plastic industries.

It is known that pure satin white is hydrated calcium trisulfoaluminate, which is used either alone or as a component in mixed fillers.

This mineral filler provides qualities of softness, whiteness and receptivity to ink, etc., which makes it one of the best known fillers for paper-making.

Many processes are known for preparing pure satin white. The traditional method of manufacture is described, for example, in the TAPPI monographs (No. 30-chapter 6, for example). But they all require manufacturing satin white by precipitation, starting with aluminium sulfate and slaked lime. A very fine precipitate of hydrated calcium trisulfoaluminate is thus obtained by various methods of manufacture; this is generally used as an aqueous dispersion. It is advisable to add to this body various additives adapted to stabilize the crystalline suspension obtained. Said mixture, consisting mainly of trisulfoaluminate calcium hydroxide and some additives, constitutes the mineral filler applied in coating formulae under the name of satin white.

Satin white has the necessary qualities to constitute a good coating charge or filler; its use for this purpose is described in a large amount of literature, among which may be mentioned U.S. Pat. No. 3,212,919. The rheological properties of casein and satin white suspensions are also known. Besides these qualities and advantages, it is also known that satin white has drawbacks owing to the fact that aqueous dispersions of satin white are very viscous and that it is difficult to use it to form dispersions at concentrations higher than 20 to 30%; it can also be said that, as it is possible for crystallinity to evolve, high levels of viscosity are also capable of evolving with time [see T.A.P.P.I. (Technical Association of Pulp and Paper Industries) Vol. 53, No. 3- March 1970].

For this reason, efforts have been, and are still being, made to obtain a product having the excellent qualities of satin white without any of its defects. A composition of pigment containing clay and calcium has been suggested, in which the satin white used is obtained from aluminium sulfate reacting on chalk. Mixtures of other charges may also be mentioned, such as systems containing large amounts of aluminium hydrate Al-(OH)$_3$(W. F. WALDECK Vol. 53 No. 3-TAPPI-March 1970), which have been proposed to obtain the high qualities of satin white.

Whatever the results so obtained, it would appear that the more generalized use of satin white is limited by the high cost of preparing same, owing to the large amounts of relatively expensive aluminium sulfate necessary.

It is also known that the hydraulic binder industry produces and uses anhydrides containing water-soluble calcic aluminates, capable of hydrating by themselves, or of providing relatively insoluble complex salts by co-precipitation with other salts. The following calcic aluminates may be mentioned in this connection:

3 (CaO) (Al$_2$O$_3$) and 12 (CaO)7(Al$_2$O$_3$) CaO,Al$_2$O$_3$ and CaO, 2 Al$_2$O$_3$ and CaO, 6Al$_2$O$_3$ Hydrated alone in hydraulic binders, said calcic aluminates provide: CaO Al$_2$O$_3$, 10 H$_2$O; 2 CaO Al$_2$O$_3$ 8 H$_2$O or 3 CaO Al$_2$O$_3$ 6 H$_2$O, 4 CaO, Al$_2$O$_3$, $n$ H$_2$O ($n$ being usually about 12 to 14 according to reaction conditions).

In the field of the same hydraulic binder industry, the hydration of systems composed of calcic aluminates has also been described, for instance, by T. D. ROBSON (High Alumina Cements), in the form of hydraulic binders, as well as that of other soluble salts, such as calcium sulfates, which can also result in the formation of hydrated lime trisulfoaluminate (usually known as ettringite) in the binder.

It is also known that the hydration of Portland Cements results in the formation of small amounts of calcium trisulfoaluminate, owing to the anhydride of composition 3 CaO, Al$_2$O$_3$ contained in said cements, and which hydrates in the presence of gypsum added to prevent false setting of Portland cements. The formation of said salt is usually avoided in the usual binders, as it has the property of forming by producing a destructive expansion; under these conditions of formation said salt is generally called Candlot salt.

Finally, binders have already been proposed which, as the principal hydrate, give the ettringite in question (See T. D. ROBSON, op. Cit; Lafuma, 3rd Inter, Symp. Chem. of Cement-London 1952; Budnikov 4th Inter. Symp. Chem. of Cement, Washington 1960).

These different suggestions, based on systems containing a more or less large amount of ettringite, are intended to provide hydraulic binders characterized by their compactness and coherence which provide high characteristics of resistance to crushing in addition to the binding effect sought.

During trials he has conducted, the applicant has discovered that the natural or synthetic products used or formed in the hydraulic binder industry enable fine, white fillers to be manufactured corresponding to the requirements of other industries, such as paper-making, paint and plastic industries, etc. This is the general object of the present invention, which relates more particularly to the manufacture of a filler having the form and appearance of a satin white, charge or filler which is the principal and mineral portion of said filler according to the invention, a charge more generally known under the name of "Ettringite".

The invention makes possible not only the production of all forms or presentation (dry powder, solutions or suspensions at concentrations or levels which are practically variable at will), but also use as starting compounds for various industrial compounds, such as, for instance, alumina cements, cement crudes, calcium sulfates and hydraulic binders which do not exactly possess the properties of the cements they are normally intended to form.

The method for preparing ettringite or calcium trisulfoaluminate 3 CaO, Al$_2$O$_3$, 3 CaSO$_4$, 32H$_2$O is characterized, according to the invention, by the fact of simultaneously hydrating a substantially stoichiometric mixture formed at a temperature in the range of about 20° to 90° C, preferably between 25° and 60° C, of calcic aluminate (either obtained from the alumina hydraulic binder industry or prepared directly for this purpose) and natural or synthetic calcium sulfate, which is as white as possible, and water being added at least in a stoichiometric proportion for the reaction and at the most in an amount such that after reaction there is obtained a product containing 5% (dry) ettringite and 95% (by weight) water.

An ettringite-formation reaction in stoichiometric proportions designates one of the following reactions: the products reacted are introduced in proportions, such as are given hereinbelow, which are the stoichiometric proportions of the reaction. According to the reaction it is desirable not to deviate by more than 20% in either direction from the stoichiometric proportions corresponding to the formation reaction according to the invention, depending on the mixture of calcic aluminates.

Reaction (1)

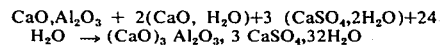

(which will be designated as "ettringite"), or a mixture of 158 parts by weight (pw) monocalcic aluminate, 148 pw hydrated lime, 516 pw gypsum and 432 pw water, providing 1254 parts by weight of ettringite.

Reaction (2)

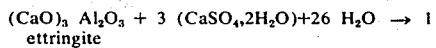

that is to say a mixture of 270 p.w. tricalcic aluminate, 516 pw gypsum and 468 pw water, giving 1254 pw ettringite.

Reaction (3)

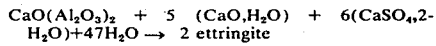

that is to say, a mixture of 260 pw monocalcic dialuminate, 370 pw hydrated lime, 1032 pw gypsum, 846 pw water, providing 2508 pw ettringite.

Reaction (4)

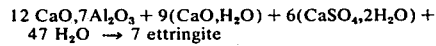

that is to say, 1386 pw of the aluminate indicated, 666 pw hydrated lime, 3612 p.w. gypsum and 3114 pw water, providing 8778 pw ettringite.

Reaction (5)

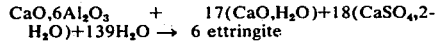

that is to say, 668 parts by weight of calcium hexaaluminate, 1258 parts by weight of calcium hydroxide, 3096 parts by weight of gypsum, 2502 parts by weight of water, providing 7524 parts by weight of ettringite.

The term calcic aluminate refers here to one of the following products, used alone at any degree of purity, or a mixture of said products in any proportions: $3CaO \cdot Al_2O_3$; $12CaO \cdot 7Al_2O_3$; $CaO \cdot Al_2O_3$; $CaO \cdot 6Al_2O_3$.

As calcium sulfate, gypsum $CaSO_4 \cdot H_2O$, $CaSO_4 \cdot \frac{1}{2}H_2O$ semihydrate, "soluble" anhydrous $CaSO_4$, "overburnt" anhydrous $CaSO_4$, or the natural form of this anhydride, known as natural anhydride, any mixtures of said components can equally well be used. Synthetic calcium sulfates obtained as by-products from the phosphorus fertilizer industry, fluorine, etc., may also be used either pure or in mixtures. Said last sulfates give the same results but can only be used on condition that non-negligible amounts of impurities they contain are compatible with the industries for which the final charge is intended. Said calcium sulfates can either be pure or contain other salts, such as calcium carbonates, magnesium carbonates, etc.

When a carbonated sulfate is used, a mixture of ettringite and calcium carbonate is obtained as reaction product. According to the invention, sulfates containing at least 60% pure calcium sulfate are preferably used.

According to another characteristic of the invention it is possible, to facilitate stoichiometry, to add anhydrous or hydrated lime in amounts such that the resulting $Ca^{++}$ ions stoichiometrically balance the ettringite-formation reactions. Preferably, according to the invention, hydrated lime and anhydrous lime, called exactly and respectively calcium hydroxide and calcium oxide, will be used. It can be pure, but may contain variable, and even high, proportions of impurities, principally calcium carbonate. It is clear here that only the $Ca(OH)_2$ portion of the mixture (lime + carbonate) is usable in the reaction. The mixtures (lime + carbonate) provide a white filler which is a mixture of ettringite and carbonate. According to the invention it is desirable to use mixtures containing less than 40% carbonate.

It is furthermore known that calcium silicates can be hydrated, providing, if sufficient water is used, a mixture of hydrated calcium silicates, calcium hydrate and possibly silica. It is also known that Portland cement, its clinker, or "white limes" have high silica contents which, when they are hydrated, provide a mixture of calcium hydrate $Ca(OH)_2$ and hydrates known as Tobermorites, $xCaO \cdot ySiO_2 \cdot zH_2O$ (with $0.85 < x/y < 2$ and $1 < z/y < 4$); said last mixture consists of 75 to 20% Tobermorites, including 0 to 20% hydrated silica expressed as $SiO_2$ and from 25 to 80% lime. A further characteristic of the invention involves using the calcium ion with, on the one hand:

calcium aluminates, pure or in mixtures, $CaO, Al_2O_3$; $CaO(Al_2O_3)_2$; $12(CaO) \cdot 7(Al_2O_3)$ or manufactured by synthesis, or obtained from known refractory aluminous binders (alumina cements for example), and on the other hand:

the natural or synthetic calcium sulfates described in the main patent, di or tri calcium silicates prepared alone, or mixed, or powdered Portland cement (preferably white), or the clinker thereof, or again, the products known as white limes which have high calcium silicate contents. More particularly in the scope of the invention the commercial form of powdered white artificial Portland cement is perfectly suitable.

The process of the invention involves hydrating at between 20° and 100° C a product containing calcium silicates, advantageously Portland cement, a product containing calcium aluminates, advantageously a refractory aluminous cement, and calcium sulfate, powdered quarry gypsum, for example, in stirring the component or components for the time necessary for hydration and in recovering a mixed compound formed, on an average, of 80 to 90% calcium trisulfoaluminate (ettringite) and from 20 to 10% Tobermorites, that is to say a compound consisting essentially of ettringite.

The raw materials mixed in the required proportions can be treated directly.

Hydration can also be effected first on the product containing calcium silicates and then provides a primary hydrate; the mixture is then hydrated with the product containing calcium aluminate and with the calcium sulfate, the proportions of the primary hydrate being fixed in accordance with the calcium aluminate available for the manufacture of ettringite, in the scope of the aforesaid reactions; finally, the mixture obtained is treated as described above.

Any of the aforementioned calcium sulfates can be used in the above reactions. Lime CaO may also be used instead of hydroxide. In these various cases, it is necessary to add the amounts of water which will not have been introduced indirectly by means of said hydrates.

The amount of water indicated is the minimum amount necessary to obtain ettringite. It is possible to use only this amount of water, but it is obvious that more may be used, depending on the components used and according to the desired final products.

Various examples of mixtures used, as will be described in detail further on, are given below.

EXAMPLE 1

Operating practically according to reaction 2, there was mixed with the corresponding amount of water one part by weight of a body containing 90% aluminate 3 CaO, $Al_2O_3$ and the remainder of impurities, with 2.02 parts by weight of a gypsum having the composition:

CaO:35–36 pw
$H_2O$:18 pw
$SO_3$:39–40 pw
$CO_2$:6 pw

EXAMPLE 2

Operating according to reaction 1, there was mixed 1 part by weight of a body containing 95% calcic aluminate CaO, $Al_2O_3$ with 3.665 parts by weight of the gypsum of example 1 and 0.90 part by weight of lime analyzed as: CaO:75% — $H_2O$:23–24% — $CO_2$:1 to 2%. The minimum amount of water results from reaction (1).

EXAMPLE 3

One part by weight of a body containing 88% aluminate CaO·2$Al_2O_3$ is mixed with 4.105 pw of the above gypsum and 1.255 pw of the above lime. The minimum amount of water is calculated from reaction 3 above.

EXAMPLE 4

Calcic aluminate mixtures A to E herein below containing the impurities indicated are used as starting materials, one part by weight of them being combined with the amounts (pw) given of gypsum (or other sulfates) and lime. The minimum amounts of water are easily determined from reactions 1 to 5 above.

Aluminate mixtures having the composition:

| Example | Impurities | Combined $Al_2O_3$ | Total CaO | CaO combined with $Al_2O_3$ | amount of aluminate mixture | gypsum as ex. 1 | $Ca(OH)_2$ such as example 2 |
|---|---|---|---|---|---|---|---|
| A | 5.5 | 53 | 36.5 | 33 | 1 p.w. | 3.16 | 0.72 |
| B | 8.5 | 58 | 27 | 24.5 | 1 p.w. | 3.45 | 0.94 |
| C | 45 | 35 | 19 | 19 | 1 p.w. | 2.08 | 0.51 |
| D | 8 | 49 | 41 | 34.5 | 1 p.w. | 2.91 | 0.61 |
| E | 8.9 | 72.5 | 26.7 | 26.6 | 1 p.w. | 3.22 | 1.04 |

It is quite obvious that the use of industrial products which are mixtures of various calcic aluminates and impurities makes it necessary to associate the formation reactions indicated so as to obtain the combination giving the best possible yield in each case.

The above table is in no way limitative and enables the invention to be embodied in all circumstances, with simple laboratory trials. The impurities are most often either calcium or magnesium carbonates, etc, or titanium or iron oxides, or a little silica or alumina for example.

Among the industrial mixtures which are particularly satisfactory for the purpose of the invention may be mentioned, among others, those corresponding to the following compositions (parts by weight).

|  | M | N | O | P | Q | R | S | T | U |
|---|---|---|---|---|---|---|---|---|---|
| Insolubles |  | 1 | 0.75 | 1.8 | 2.5 | 1.8 | 6 | 0.8 | 0 |
| $TiO_2$ |  | 0.7 | 2 | 2 | 0.25 |  | 0.1 |  |  |
| $Fe_2O_3$ |  | 0.05 | 0.05 | 0.1 | 3.5 |  | 0.5 |  | 0.07 |
| $SiO_2$ | 1 | 7.5 | 5 | 4.5 | 1 | 0.1 | 2.5 | 1.2 |  |
| MgO |  | 1.3 | 0.2 | 0.2 |  |  | 0.2 | 11.5 |  |
| Alkalines |  | 0.15 | 0.25 |  |  | 0.3 | 0.2 |  |  |
| Volatiles | 0.5 | 0.5 | 0.03 | 1 | 0.5 | 0.3 | 4.5 |  | 0.24 |
| $Al_2O_3$ | 63 | 49 | 52 | 53 | 55 | 66 | 64 | 69 | 72 |
| CaO | 34 | 40 | 40 | 39 | 37 | 33 | 27 | 18 | 27 |

Examples are described below illustrating certain of the possible processes for carrying out the invention industrially; they bring out the flexibility and facility with which the process is effected, as well as the qualities of the products obtained. In these examples the mixture of aluminates corresponding to column U of the table was used.

EXAMPLE 5

In a vat fitted with a powerful stirring device of known type, there were put 12.6 parts by weight of U type aluminate mixture, 40.6 pw gypsum of the composition given in example 1 and 13.2 pw lime of the composition given in example (2). The aluminate is a white solid, ground extremely fine, for example having a surface area between 4000 $cm^2/g$ to 8000 $cm^2/g$; it is obtainable on the market in the form of a refractory alumina cement.

The stoichiometric amount of water necessary to form ettringite was added, that is, with the above components, 33.6 parts by weight, and the mixture thus formed provided 100 pw ettringite.

In order to facilitate the reaction on the one hand, and manipulation of the products on the other, additional water was added (that is to say water not chemically necessary for the reaction). As an example, it was possible to add to the above mixture from 50 parts by weight of water (which gives a thick paste) to 1900 parts by weight (which gives a very liquid product).

Adding 650 pw water, the reaction was carried out at between 25° and 60° C. The mixture was maintained continuously in suspension by stirring. Hydration was stopped between 8 h and 48 h later, according to the operating conditions, for example after 36 h. A paste containing only ettringite was obtained, with the inerts introduced with the industrial reaction products. The ettringite can be used as it is, or dried to obtain the product in the form of a white powder.

It is easy to supervise the progress of the reaction, either by studying the crystallized bodies whose appearance and disappearance can be followed by X-rays, or by measuring the water, bonded in the hydrates by the techniques usually used by cement manufacturers.

It is seen that, in this process, melting of the alumina salt is the slow step of the reaction; it is therefore preferable in practice to grind this element very finely in order to accelerate the reaction.

EXAMPLE 6

The same mixture was prepared as in example 5, but only exactly the amount of water necessary for the reaction was used. Several days later a solid consisting mainly of ettringite was obtained which only had to be ground to obtain calcium trisulfoaluminate in dry powder form. The reaction was slower in this case, as determinations showed that at 24 hours only 67% of the ettringite it was possible to form had actually been obtained. However, this is a good way of obtaining a dry ettringite.

It was moreover noted that, according to the invention, a quicker rection was obtained by introducing the necessary substances into a non-polluting grinding system, and effecting the reaction completely, or partially, in said medium. With this end in view it is advantageous to use a hard steel metal jar, either in the natural state or with the inside coated with a special coating and filled with corundum or porcelain balls. Grinders, such as this, are in current use in the mineral substances industry. The following example describes this embodiment of the invention.

EXAMPLE 7

A stoichiometric mixture according to example 5 was introduced into a grinder-jar, followed by the amount of water necessary for the ettringite obtained to have a concentration of 15 percent by weight. Corundum balls were also introduced in the usual proportions, and the jar was rotated at 70 revolutions per minute for 24 hours. The product obtained was examined by X-ray diffraction after 24 hours and ettringite containing no anhydrides was observed to have formed.

A white paste was thus obtained containing very fine particles of calcium trisulfoaluminate, which is the mineral charge or filler known in the paper-making industry as satin white. Said charge can then be delivered industrially in the form of said aqueous dispersion; it is also possible to evaporate off the excess water by any suitable industrial drying process and so obtain said charge in a powder form.

One drop of the solution was examined under a microscope and all the particles were observed to be of submicron size. To define the product better, it was dried by means of hydroscopic solvents, such as acetone, then with ether, or in an oven at 40°–60° C, a few hundred grams of said product (correctly sampled) being representative of the whole. A dry powder was obtained, having the following characteristics, which are those of the various dry products resulting from the above examples:

constitution: ettringite (determined by X-ray diffraction)
appearance: white powder
whiteness determined by photovolt: $\beta = 93.5\%$ for $\lambda_d = 574.5$ m $\mu$.
index of refraction: 1.46
Chemical analysis: $Al_2O_3$ (8 to 11%), CaO (26 to 27%), $SO_3$ (18 to 20%), insolubles including $SiO_2$(-traces)melting loss (42 to 46%).

In the case of the paper industry, the ettringite powder further corresponds to the following characteristics:

Specific surface on dried and reground product: 11.21 m²/g
Oil absorption (Rub out test): 68g/100 g
Water-solubility in moles: $0.3 \times 10^{-3}$ mole/1
Water-solubility (Codex method): 0.64
HCl N/4 solubility (Codex method): 26.95
Fineness measured with COULTER COUNTER screen:
< 10 microns 99.5%
< 5 microns 96%
< 3 microns 81%

| Chemical analysis: | | |
|---|---|---|
| | $SiO_2$ | 1 % |
| | $Al_2O_3$ | 10.5 % |
| | CaO | 26.5 % |
| | $SO_3$ | 18.5 % |
| | $CO_2$ | 1.4 % |

Moisture at 105° C:32.50%; melting loss at 1000° C:42.80%; pH at 10% in water:9.80%.

Generally speaking, the process therefore makes it possible to prepare the satin white charge at a relatively low price, substantially lower than that at present practiced in the traditional manufacturing process from an aluminum sulfate lime mixture. The decrease in price so obtained should permit satin white not only to win a place in the paper-making industry which its qualities, but not its price, entitle it to, but also to be used in formulations for paints, coatings, or even thicker systems of binders containing plasters, etc.

Starting from example 7, the product was subjected to tests to study operating conditions. The trials described in the following examples confirmed the flexibility and ease with which ettringite was obtained, as the principal hydrate produced by the process of the invention.

The following is the principle of the trials:
the mixture is introduced into a jar as in example 7.
At fixed times a portion of the paste is removed and is immediately dried in acetone, then in ether, in order to examine the state of the reaction by X-ray diffraction.

On said dried product the total bound water was also determined by the difference between the melting loss at 900° C and the $CO_2$ content measured by a calcimeter. It is noted that the mixture contains for 100 parts: 80.9 pw products non-volatile at 900° C including 73.3 pw hydratable anhydride. The bound water was brought to 100 parts of the calcined product. This enables the level of hydratable product actually hydrated to be calculated directly and also to follow the real gain in water from one test to another.

The influence of the following factors was studied in a corresponding series of trials:

A- Dry mixture: water ratio before hydration: or: $A_1:0.1/1 - A_2:0.2/1 - A_3:0.3/1$.

| B- Reaction times : | 2 h  | 4 h  | 6 h  | 8 h  | 24 h |
|---|---|---|---|---|---|
|                     | B1   | B2   | B3   | B4   | B5   |

C-Ratio of grinding bodies by weight on the non-hydrated paste:

$C_1:1 - C_2:2 - C_3:1.5$

D-Diameter of grinding bodies: D1: 20 mm - D2: 30 mm - D3:50% of each of the two diameters.

E- Reaction temperature
E 1: ambient temperature, that is 25° C
E 2: products and apparatus heated, at the outset of reaction, to 50° C.

F. Fineness of the alumina salt used:
F 1: Blaine fineness 3800 cm²/g
F 2: Blaine fineness 8000 cm²/g G- Influence of gypsum grinding on the colour of the products obtained [iron grinder (G1) or porcelain grinder (G2)].

After having first studied the grinding time giving optimum yield, the influence of each of the factors described was studied.

Results were as follows:

Amount of bonded water in percent of calcined, as a function of reaction time and under the following conditions:

A1 - C2 - D3 - E1 - F1 - G1 theoretical maximum bound water: 75.9 pw for 100 parts of calcined. The results at various terms are as follows:

|  | Non hydrated dry mixture | 2 h | 4 h | 6 h | 8 h | 24 h |
|---|---|---|---|---|---|---|
| bound water per 100 calcined | 20.65 | 35.15 | 45.85 | 59.7 | 60.65 | 64.10 |
| yield bound water per 100 calcined/ theoretically bindable water × 100 | 27.20 | 46.3 | 60.35 | 78.6 | 79.65 | 84.4 |

Yield as calculated in % of bonded water based on theoretically bondable water if the ettringite formed is written: $3 CaO, Al_2O_3, 3 CaSO_4, 32 H_2O$.

The 6 hour term corresponds in practice and under these conditions to the best economic yield. It is retained for the following tests:

a. the components of example 1 are used and the reaction is effected:
under conditions: B3 - C2 - D3 - E1 - F1 - G1
The result is as follows:

|  | $A_1$ | $A_2$ | $A_3$ |
|---|---|---|---|
| bound water for 100 calcined | 59.7 | 64.3 | 53.3 | b. the components of example 1 are again used and the reaction is effected:

under conditions A1 - B3 - D3 - E1 - F1 - G1
There is obtained

|  | C1 | C2 | C3 |
|---|---|---|---|
| water bound per 100 calcined | 52.5 | 59.7 | 54.0 | c. the components of example 1 are again used and the reaction is effected:
under conditions A1 - B3 - C1 - E1 - F1 - G1
There is obtained

|  | D1 | D2 | D3 |
|---|---|---|---|
| bound water per cent of calcined | 49.6 | 49.2 | 52.5 | d. the components of example 1 are again used and the reaction is effected:
under conditions: A1 - B3 - C2 - D3 - F1 - G1
There is obtained:

|  | E1 | E2 |
|---|---|---|
| bound water per cent of calcined | 59.7 | 66.25 | e. the components of example 1 are again used and the reaction is effected:
under conditions: A1 - B3 - C2 - D3 - E1 - G1
There is obtained:

|  | F1 | F2 |
|---|---|---|
| bound water per cent calcined | 59.7 | 62.95 |

EXAMPLE 9

The same components were used as in example 7 and the reaction was effected under conditions: A1- B5 - C2 - D3 - E1 - F1. The following values of whiteness were observed based on G (gypsum ground finer than 100 microns); the whiteness values being expressed in trichromatic coordinates.

$\beta$ = brightness or factor of luminescence
$\lambda_d$ = dominant wavelength
P = purity of colour

|  | G1 | G2 |
|---|---|---|
| whiteness of gypsum | $\beta = 77.1$<br>$\lambda d = 577$ m $\mu$<br>$P = 7.4\%$ | 77.3 %<br>577.5 m $\mu$<br>9.1 % |
| whiteness of the ettringite obtained | $\beta = 92.8$<br>$\lambda d = 577.5$ m $\mu$<br>$P = 2.4\%$ | 92.2 %<br>577.5 m $\mu$<br>2.9 % |

EXAMPLE 10

The mixture of example 7 was used, but replacing the hydrated lime by industrial lime, known as "flowers of lime" having the following composition:

|  |  |  |  |  |
|---|---|---|---|---|
|  | $SiO_2$ | 0.5 | to | 1 % |
|  | CaO | 73 | to | 74 % |
|  | $H_2O$ | 22 | to | 23 % |
| and | $CO_2$ | 2 | to | 3 %. | its whiteness was compared with that of example 7:

|  | $\beta$ | $\lambda_d$ | P |
|---|---|---|---|
| lime example 7 | 88.5 %: | 577 m$\mu$ | 4.15 % |
| lime example 10 | 90.8 % | 578 m$\mu$ | 4.8 % |

This lime given by way of example can therefore be used without prejudice to the colour obtained.

EXAMPLE 11

This example shows that it is possible to replace the gypsum mentioned by synthetic gypsums, manufacturing waste products of chemical products.

11a. Operating as in example 8, that is to say, $A_1$- $B_3$- $C_2$ - $D_3$ - $E_1$ - $F_1$, the gypsum used was replaced by phosphogypsum of composition: Silica 1% - CaO 33% - $H_2O$ 20% - $SO_3$ 44% - $P_2O_5$ 1% - F 0.5 to 1%. That is to say that the following mixture is formed:
 61.8% phosphogypsum
 19.42% calcium hydroxide having the composition given in example 2,
 18.77% of the calcic aluminate mixture U.

Said mixture containing per 100 parts: 82.75 pw calcined product, including 77.3 pw hydratable anhydrides The following ratio was obtained
 bound water: 62.85 per cent calcined 11b. The phosphogypsum was replaced by fluoranhydrite (from Salindres) having the composition:
 CaO:42 %
 $SO_3$:56–57%
 F:1% to form the following mixture:
 55.87% fluoranhydrite
 22.43% calcium hydroxide of the composition given in example 2
 21.70% of the mixture of calcic aluminate 4.

Said mixture containing for 100 parts: 94 pw calcined product including 89.4 parts hydratable anhydrides. After treatment under the operational conditions of the preceding example the following ratio was obtained:
 bound water = 61.25 per 100 calcined 11c. The fluoranhydrite was replaced by Silobore gypsum:
 CaO:31–32%
 $H_2O$:19–20%
 $SO_3$:44–45%
 $SiO_2$:2 %
 $B_2O_3$:2 % to obtain a mixture containing
 61.75% Silobore gypsum
 19.45% calcium hydroxide as in example 2
 18.80% white alumina cement, type U Said mixture containing per 100 parts: 83.10 pw calcined product including 77.45 pw hydratable anhydrides. After treatment under the operation conditions of the preceding example, the following ratio was obtained:
 bound water = 53.10 per 100 calcined 11d. The Silobore gypsum was replaced by gypsum from the "Salins du Midi":
 CaO:35–36%
 $H_2O$:15–16%
 $SO_3$: 48–49% to obtain the following mixture:
 59.75% "Salins du Midi" gypsum
 20.45% calcium hydroxide as in example 2
 19.80% white alumina cement, type U.

Said mixture containing per 100 parts: 85.35 pw calcined product including 81.5 parts hydratable anhydrides. After treatment under the operation conditions of the preceding example, the following ratio was obtained:
 bound water = 60.60 per 100 calcined.

11e. The "Salines du Midi" gypsum was replaced by Tarascon natural anhydrite of composition:
 CaO:43%
 $SO_3$:50%
 $CO_2$:6% to obtain a mixture containing:
 59.05% anhydrite
 20.80% calcium hydroxide as in example 2
 20.15% white alumina cement type U.

Said mixture containing 82.90% hydratable anhydrides per 93.35% calcined product.

After treatment according to the operation conditions of the preceding example the following ratio was obtained:
 bound water = 68.30 per 100 calcined.

EXAMPLE 12

The gypsum used in example 1 and in the other examples using it contains 1 to 2% $CO_2$, or 2.27 to 3.55% $CaCO_3$.

Industrially, it may be advantageous to start with products having a higher carbonate content, as they are more easily obtainable and cheaper. In this context, the following mixture was effected:
 Gypsum of composition CaO:42 pw
SO$_3$:27.9 pw
CO$_2$:17.6 pw
H$_2$O:12.6 pw
said composition corresponding to 40% CaCO$_3$ for 60% gypsum.

Simultaneously, a lime with a very high carbonate content was taken, having a composition:
CaO:69.8 parts by weight
H$_2$O:17 parts by weight
CO$_2$:13.2 parts by weight
corresponding to a mixture of 70% by weight Ca(OH)$_2$ with 30% by weight CaCO$_3$.

Said components were mixed with U type calcic aluminate, in stoichiometric proportions of active elements, that is to say that the following mixture was prepared:
Gypsum(composition above):537 parts by weight
Lime (composition above):149 parts by weight
Calcic aluminates (U type ):100 parts by weight
Stoichiometric water:267 parts by weight
Water added to facilitate hydration:3040 parts by weight.

The operation was effected as in example 8, under conditions A$_1$, B$_3$ C$_2$, D$_3$, E$_1$, F$_1$ and an aqueous dispersion was obtained containing 260 pw calcium carbonate, 700 p.w. ettringite and 3040 pw water.

Two examples are given below of the preparation of the main basic compound ettringite obtained by using a source of lime formed of Portland cement.

EXAMPLE 12 a. In a ball mill containing corindon balls there was hydrated a white Portland cement having the composition:
SiO$_2$:23.7 parts by weight
Al$_2$O$_3$:2.7 parts by weight
SO$_3$:1.19 parts by weight
CaO:69.3 parts by weight
Fe$_2$O$_3$:0.28 part by weight
Volatile materials: 1.80 part by weight One third by volume of the mill was filled with balls, one third with a mixture of water and cement, the water being present in a weight ratio of 2.5 times the weight of cement. One third of the mill was left free to permit crushing.

Hydration was effected at between 20° and 100° C, at 80° C for example. After 13 hours crushing, hydration was observed to be complete and the product formed consisted, by weight, of 57.5% Tobermorites having an inclusive formula (CaO)$_3$ ( SiO$_2$)$_2$ ( H$_2$O)$_4$ and 42.5% calcium hydrate Ca(OH)$_2$.

The amounts of said mixture to be introduced into the reaction corresponding to the calcium aluminate available for the manufacture of ettringite was then calculated as will be seen hereinafter.

b. the following products were then mixed:
a refractory alumina cement (mixture of calcium aluminates) of the composition:
Al$_2$O$_3$:72 parts by weight
CaO:27 parts by weight
Volatile materials: 0.24 part by weight
Fe$_2$O$_3$:0.07 part by weight.
and combined principally in the form of CaO Al$_2$O$_3$;-CaO (Al$_2$O$_3$)$_2$.
as calcium sulfate, a natural quarry gypsum of the composition:
CaO:35–36 parts by weight
SO$_3$:39–40 parts by weight
CO$_2$:6 parts by weight
H$_2$O: 18 parts by weight
and present in the form of a fine powder having a Blaine index of 4.000.

The primary hydrate obtained according to 12(a).

The components were mixed in a reactor in the following proportions:
high alumina cement:16.5 parts by weight
calcium sulfate:63.5 parts by weight
primary hydrate:47.0 parts by weight Operating according to any of the processes described in examples 1 to 7 and under the same conditions, a fine, white inert mineral powder was obtained consisting in this case of 162 parts by weight of ettringite and 27.5 parts by weight of Tobermorites and 1% miscellaneous products, or mainly 85.5% calcium trisulfoaluminate and 14.5% Tobermorites..

EXAMPLE 13

Using the process of the aforesaid ball mill, the following mixture of the same components was hydrated:
alumina cement:16.5 parts by weight, or 14.2% by weight
calcium sulphate:63.5 parts by weight, or 54.7% by weight
white Portland cement:36.0 parts by weight, or 31.1% by weight Hydration was effected, as described in example 7, for 16 hours.

After this period of time, a fine, inorganic powder in suspension in water was obtained consisting, as above, of 85.5% calcium trisulfoaluminate and 14.5% Tobermorites.

Dried by the conventional methods used in the mineral pigments industry, said powder had the following characteristics:
aspect:impalpable white powder
fineness:100% < 10 $\mu$
composition : mixture consisting mainly of calcium trisulfoaluminate and Tobermorites, that is to say 3CaO. Al$_2$O$_3$·3CaSO$_4$·30 to 32H$_2$O, $x$CaO·$y$SiO$_2$·$z$(-H$_2$O) ($x/y$ between 0.85 and 2, $z/y$ between 1 and 4).
real density of the charge:2.06
pH at 10% in water:10.2
whiteness:94.1%
rub out test:65 g/100 g
Rheologic characteristics of the aqueous dispersions:

| | thixotropy |
|---|---|
| -composition at 1000° C of the preparation with 85% trisulfoaluminate | residue: 56.5% volatiles: 43.5% including water: 41.6% CO$_2$: 1.9% |

The two examples given above correspond to the production of specific mixtures consisting on Tobermorites and primarily of ettringite. Taking into account the limits given, it is possible according to the invention to prepare, as compounds principally containing calcium trisulfoaluminate, mixtures of Tobermorites, hydrated silica and calcium trisulfoaluminate in proportions of:
31% to 2% Tobermorites including 0 to 4% silica expressed as SiO$_2$ and 69 to 98% hydrated calcium trisulfoaluminate (satin white).

According to the invention, said powder, or the paste of the first examples, is a synthetic mineral charge of great value to all industries which use such products, and notably for paper making (mass and coating), water paints, organic paints, putties and coatings, fertilizers, pharmacology, etc .... It can be used as a support for liquids, etc ....

In the following examples, the results which may be obtained with the compounds of the invention used in the paper making and paint industries are described:

I. Paper-making a. To show the gain of dry extract which is obtained with the charge according to the invention compared with a traditional satin white under the best possible conditions and optimising the amount of dispersant added according to each pigment, aqueous dispersions of the same viscosity were prepared:

|  | Rates of dispersant | Concentration of dry matter for 500 centipoises |
|---|---|---|
| Traditional satin white | 0.6% | 29% |
| Charge according to the invention | 0.5% | 48% | b. Using the methods traditional to paper making coating sauces of the following compositions were prepared:

|  | Formula A | Formula B | Formula C |
|---|---|---|---|
|  | Kaolin | Normal Satin white | Charge according to the invention |
| Amount of charge | 40 parts by weight | 40 p.w. | 40 p.w. |
| Amount of dry starch | 3.6 | 4.4 | 4.4 |
| Amount of dry dispersant | 0.16 | 0.24 | 0.20 |
| Amount of dry vinyl emulsion |  |  |  |
| Amount of water | 52.64 | 51 | 51 |

However, the preparation of these formulae invites the following remarks:

For formulae A and C, the amount of charge is dispersed in water with the dispersant added, as follows:

| I | water | 38.24 p.w. |
|---|---|---|
|  | dry dispersant | according to the formula |
|  | dry charge | 40 |

It is easy to obtain dispersion of the components of formula I, in a slowly turning mixture for example. Part II of the formula is then added:

| II | starch at 20 % | 18 |
|---|---|---|
|  | latex at 50 % | 7.2 |

In the case of formula B (usual charge) on the other hand, dispersal of part I should first be effected:

| I | water | 29.40 p.w. |
|---|---|---|
|  | dry dispersant | according to the formula |
|  | starch at 20% | 22 including 17.6 water |
|  | Satin White charge | 40 |

This preliminary operation is necessary because of the high levels of viscosity satin white confers on its dispersions; it is necessary to disperse said satin white in a preparation which already contains starch, which makes it possible to have a large amount of water when dispersion is effected; in spite of this precaution dispersion still remains difficult because, as its dry satin white extract is 46% by weight, it is only then possible to add the remainder of the formula given.

The coating sources so prepared have the following characteristics:

| Formula | A | B | C |
|---|---|---|---|
| Brookfield viscosity at 100 r/min | 112 cp | 450 cp | 220 cp |
| pH | 6.5 | 9.7 | 10.1 |
| water retention (seconds) | 15 | 12 | 19 |

Applied to normal AFNOR VII paper, these sauces gave the following results:

| Formula | A | B | C |
|---|---|---|---|
| Aspect | glazed | glazed | glossy |
| Weight of coating g/m²/surface | 12 | 12 | 12 |
| Whiteness % | 81.6 | 87.9 | 89.4 |
| Opacity % | 87.6 | 89 | 89 |
| Yield of optical blueing agents | 2.4 | 5.8 | 5.8 |

The great advantages of the charge according to the invention for use in coating paper, compared with the results obtained with normal satin white, are easily seen: having a high satin white (calcium trisulfoaluminate) content, it possesses the excellent qualities of said product, it provides equivalent or superior optical qualities and has very good water retention properties. Furthermore, its rheologic characteristics enable it to be used and prepared by the techniques usually used in paper making without taking special precautions.

c. the charge according to the invention can be used admixed with kaolin, as is most usually done in paper making; coating sauces of the same formulation as in example Ib) were prepared, with the following mixtures as mineral compositions:

| Formula | D | E | F |
|---|---|---|---|
| composition of the |  |  |  |

-continued

| Formula | D | E | F |
|---|---|---|---|
| charges | kaolin 100% | kaolin 80% satin white 20%; | kaolin 80% charge according to the invention 20% |

Said preparations were obtained with difficulty or special precautions.

Applied under the same conditions, said sauces gave the following results:

| Formula | D | E | F |
|---|---|---|---|
| Weight of coating deposited g/m²/surface | 15 | 15 | 15 |
| Whiteness % | 82.2 | 85.3 | 85.4 |
| Opacity % | 88.3 | 89.1 | 89.2 |

II. Paint

For an interior and exterior vinyl emulsion paint part I was prepared:

| | | Parts by weight |
|---|---|---|
| I | methylcellulose type protective colloid | 0.3 |
| | water | 23 |

There was added:

| | | Parts by weight |
|---|---|---|
| II | STABIRON ionic dispersant manufactured by PROTEX | 0.1 |

In the mixture I + II, the following charges were rapidly dispersed:

| | | Parts by weight |
|---|---|---|
| III | charge according to the invention | 20.0 |
| | rutile titanium dioxide | 6 |
| | barium sulfate | 5.2 |

Without slow stirring there was added:

| | Parts by weight |
|---|---|
| 50% dry extract vinyl extract | 31.2 |
| di-butyl phthalate | 1 |
| ethyl glycol | 2.2 |
| spirits of turpentine | 0.3 |
| water for viscosity | 10 |
| | 99.3 |

Said paint has a dry extract of 47.2% and a non-adjusted pH of 10.1. It is very stable in time as is shown by the following observations:

| Time | 0 | 1 day | 7 days | 3 months |
|---|---|---|---|---|
| Viscosity (Brookfield 100 r/min.) | 550 cp. | 585 cp. | 580 cp. | 578 cp. |
| pH | 10.1 | 10.0 | 9.9 | 10 |

After this period of time and in spite of the presence of barium sulfate no deposit was observed in the paint.

The charge confers a thixotropic character on the mixture permitting easy application without running.

It is understood that cements which are not white can be used when the colour of the final product does not have to be specially pure.

It is therefore obvious that the invention provides the means necessary for extending the possibilities of normal satin white, with remarkable flexibility and facility of manufacture and costing less to manufacture than the known process. It notably has the advantage, owing to the wide possibilities of productions it provides, of permitting the choice of the ideal charge in each case.

What we claim is:

1. A process for preparing ettringite or calcium trisulfoaluminate ($3 CaO \cdot Al_2O_3 \cdot 3CaSO_4 \cdot 32 H_2O$) according to a reaction depicted by at least one of the following reaction schemes:

a. $CaO \cdot Al_2O_3 + 2(CaO \cdot H_2O) + 3(CaSO_4 \cdot 2H_2O) + 24H_2O \rightarrow$ ettringite b. $(CaO)_3Al_2O_3 + 3(CaSO_4 \cdot 2H_2O) + 26 H_2O \rightarrow$ ettringite c. $CaO(Al_2O_3)_2 + 5(CaO \cdot H_2O) + 6(CaSO_4 \cdot 2H_2O) + 47H_2O \rightarrow 2$ ettringite d. $12 CaO \cdot 7Al_2O_3 + 9(CaO \cdot H_2O) + 21(CaSO_4 \cdot 2H_2O) + 173H_2O \rightarrow 7$ ettringite e. $CaO \cdot 6Al_2O_3 + 17(CaO \cdot H_2O) + 18(CaSO_4 \cdot 2H_2O) + 139H_2O \rightarrow 6$ ettringite which comprises forming a substantially stoichiometric mixture of calcic aluminate and calcium sulfate in an amount of water which is at least a stoichiometric proportion and at most sufficient to yield a product containing 5 percent by weight of (dry) ettringite and 95 percent by weight of water, and effecting reaction at a temperature in the range of from 20° to 90° C; the calcium sulfate having as white a color as possible, and the stoichiometric mixture and the stoichiometric proportion being based on the reaction.

2. A process according to claim 1 wherein hydration is effected at a temperature in the range of from 25° to 60° C.

3. A process according to claim 1 wherein the reaction comprises that of reaction scheme (a).

4. A process according to claim 1 wherein the reaction comprises that of reaction scheme (b).

5. A process according to claim 1 wherein the reaction comprises that of reaction scheme (c).

6. A process according to claim 1 wherein the reaction comprises that of reaction scheme (d).

7. A process according to claim 1 wherein the reaction comprises that of reaction scheme (e).

8. A process according to claim 1 which comprises adding sufficient anhydrous or hydrated lime to the mixture to satisfy the stoichiometric requirement for clacium.

9. A process according to claim 1 wherein the calcic aluminate is at least one member selected from the group consisting of $3CaO \cdot Al_2O_3$, $12CaO \cdot 7Al_2O_3$, $CaO \cdot 2Al_2O_3$ and $CaO \cdot 6Al_2O_3$.

10. A process according to claim 1 wherein the calcium sulfate is at least one member selected from the group consisting of gypsum ($CaSO_4 \cdot 2H_2O$), semihydrate ($CaSO_4 \cdot \frac{1}{2} H_2O$), "soluble" anhydride, "over-burnt" anhydrous $CaSO_4$ and natural anhydrite.

11. A process according to claim 1 wherein the calcium sulfate comprises natural carbonated calcium sulfate containing at least 60 percent pure calcium sulfate.

12. A process according to claim 1 which comprises adding to the mixture carbonated hydrated lime containing less than 40 percent carbonate.

13. A process according to claim 1 wherein amounts of respective reactants do not vary more than 20 percent from stoichiometric requirements.

14. A process according to claim 1 wherein reactants comprise refractory alumina cement, gypsum and lime.

15. A process according to claim 1 which comprises adding to the mixture an excess of from about 50 to 1900 parts by weight of water per 100 parts by weight of ettringite to be prepared, maintaining the mixture in suspension during reaction, and using thus-prepared ettringite in the suspension in which it is formed.

16. A process according to claim 1 which comprises adding to the mixture an excess of from about 50 to 1900 parts by weight of water per 100 parts by weight of ettringite to be prepared, maintaining the mixture in suspension during reaction, drying thus-prepared ettringite, and recovering the resulting product in powder form.

17. A process according to claim 1 wherein the aluminate is in finely divided form.

18. A process according to claim 1 wherein the mixture of calcic aluminate and calcium sulfate further contains calcium silicate in an amount corresponding to a final product having from 80 to 90% by weight of ettringite and from 20 to 10% by weight of tobermorite.

19. A process according to claim 18 which comprises hydrating calcium silicate, calcium aluminate and calcium sulfate to form a mixture comprising from 80 to 90 percent by weight of ettringite and from 20 to 10 percent by weight of Tobermorites.

20. A process according to claim 19 wherein the calcium silicate comprises Portland cement, the calcium aluminate comprises refractory alumina cement, and the calcium sulfate comprises powdered quarry gypsum.

21. A process according to claim 19 which comprises mixing primary hydrate, obtained by hydrating the silicate, with calcium aluminate and with calcium sulfate, the primary hydrate being in a proportion based on available calcium aluminate.

22. A process according to claim 18 which comprises simultaneously hydrating calcium silicate, calcium aluminate and calcium sulfate to form a mixture comprising from 80 to 90 percent by weight of ettringite and from 20 to 10 percent by weight of Tobermorites.

23. A process according to claim 1 wherein the calcium sulfate is a synthetic industrial by-product.

* * * * *